(12) United States Patent  
Prudham

(10) Patent No.: US 9,016,229 B2  
(45) Date of Patent: Apr. 28, 2015

(54) INDICATOR DEVICE OF AN INSTRUMENT PANEL WITH A COMPLEX PLANAR MOVEMENT

(75) Inventor: Daniel Prudham, Thise (FR)

(73) Assignee: Moving Magnet Technologies (MMT), Besançon (FR)

( * ) Notice: Subject to any disclaimer, the term of this patent is extended or adjusted under 35 U.S.C. 154(b) by 388 days.

(21) Appl. No.: 13/699,156

(22) PCT Filed: May 19, 2011

(86) PCT No.: PCT/FR2011/051137  
§ 371 (c)(1),  
(2), (4) Date: Jan. 23, 2013

(87) PCT Pub. No.: WO2011/148082  
PCT Pub. Date: Dec. 1, 2011

(65) Prior Publication Data  
US 2013/0118398 A1    May 16, 2013

(30) Foreign Application Priority Data  
May 26, 2010 (FR) .................................... 10 02218

(51) Int. Cl.  
*G01D 7/00* (2006.01)  
*G01D 7/10* (2006.01)  
*G01D 13/22* (2006.01)

(52) U.S. Cl.  
CPC .................. *G01D 7/00* (2013.01); *G01D 13/22* (2013.01); *G01D 7/10* (2013.01); *Y10S 116/06* (2013.01)

(58) Field of Classification Search  
CPC ...................................................... Y10S 116/06  
USPC ............................. 116/284, 327, 328, DIG. 6  
See application file for complete search history.

(56) References Cited

U.S. PATENT DOCUMENTS

| | | | |
|---|---|---|---|
| 4,601,585 A * | 7/1986 | Farley | 368/80 |
| 5,720,590 A | 2/1998 | Hofmeister | |
| 6,102,164 A | 8/2000 | McClintock et al. | |
| 7,503,278 B2 | 3/2009 | Sigg et al. | |

FOREIGN PATENT DOCUMENTS

DE    102005015178 A1    10/2006  
FR          2679998 A1     2/1993  
(Continued)

OTHER PUBLICATIONS

English Translation of the International Preliminary Report on Patentability Chapter I, IB, Geneva, issued Nov. 27, 2012, incorporating the English Translation of the Written Opinion of the ISA, ISA/EP, mailed Nov. 30, 2011 (8 pages).

*Primary Examiner* — Laura Martin  
*Assistant Examiner* — Irving A Campbell  
(74) *Attorney, Agent, or Firm* — Harness, Dickey & Pierce, P.L.C.

(57) ABSTRACT

The disclosure relates to an indicator device that can be used on an instrument panel comprising two electric motors, two concentric shafts, a visual information member moved in translation by one of the shafts in a transverse direction relative to the axis of rotation of the shaft, and a guide member that is rotatably linked to the other shaft, rotates the visual information member with itself, and guides the visual information member in translation in the transverse direction. According to the disclosure, the two shafts are concentric, the visual information member is self-supporting, and the visual information member is longer than the guide member in the transverse direction.

12 Claims, 3 Drawing Sheets

(56) References Cited

FOREIGN PATENT DOCUMENTS

| FR | 2868556 | A1 | * | 10/2005 | ............ | G04B 19/04 |
| FR | 2938056 | A1 | | 5/2010 | | |
| JP | 63133017 | A | * | 6/1988 | ............ | G01D 13/22 |
| WO | WO-2006120515 | A1 | | 11/2006 | | |

* cited by examiner

INDICATOR DEVICE OF AN INSTRUMENT PANEL WITH A COMPLEX PLANAR MOVEMENT

CROSS-REFERENCE TO RELATED APPLICATIONS

This application is a National Phase Entry of International Application No. PCT/FR2011/051137, filed on May 19, 2011, which claims priority to French Patent Application Serial No. 10/02218, filed on May 26, 2010, both of which are incorporated by reference herein.

TECHNICAL FIELD

The invention relates to the field of systems driving a visual information member such as a pointer, and more particularly to the motion of such a member for an indicator for an instrument panel (tachometer, fuel gauge, . . . ). More precisely, the invention relates to an indicator device that can be used, more particularly, on the instrument panel of a vehicle and which includes at least a first and a second motor, a first and a second shaft, a guide member, a visual information member and a kinematic link, with the first and second shafts being selectively driven in rotation by the respective first and second motors about the respective first and second axes of rotation, with the guide member being rotatably linked to the first shaft about the first axis of rotation and extending in a transverse direction relative to this first axis of rotation, with the visual information member being guided in translation, in the transverse direction, by the guide member, and the kinematic link connecting the second shaft to the visual information member and selectively transforming a rotation of the second shaft about the second axis of rotation into a translation of the visual information member in the transverse direction.

BACKGROUND

An indicator device of this type is for example disclosed in the patent FR 2 679 998. In spite of its interest, especially because of the possibility offered by the device to simultaneously display two different parameters, the device disclosed in the prior patent has important overall dimensions, more particularly because it involves the utilisation of semi-circular shaped dials.

More generally many solutions of the prior art are already known for moving the pointer of an instrument panel indicator. For instance, the patent document FR 2 859 323 discloses a system making it possible to rotatably move such a pointer. According to this document, the pointer is driven by a brushless motor, through a mechanical reduction system.

For instance again, the patent FR 2 885 688 discloses an assembly composed of two juxtaposed motors driving two coaxial shafts making it possible to rotatably move two pointers independently, with such arrangement being more particularly intended for concentric indicator gauges. Such driving systems make it possible to move one or two pointer(s) in one plane, but in an angular motion only.

Motor vehicle manufacturers have recently developed new types of gauges, the display of which non longer has a disk shape but elliptic or oblong shapes, as illustrated in FIG. 1, for instance. However, there is at present no analogue indicator with a simple structure which is controlled by electromagnetic motors and which is adapted to this new type of gauges, since the current solutions mostly use a liquid crystal digital display system. Motor assemblies are also known from patents U.S. Pat. No. 5,720,590 and EP 0 793 262, which make it possible to move semi-conductor matrices, with the motion being planar. These known devices still have the drawback of having important overall dimensions which limit the field of application thereof.

SUMMARY

In this context, the present invention aims at providing an indicator device which can more particularly be used on the instrument panel of a vehicle, which makes it possible to move a visual information member in a complex motion and which is free of at least one of the above-mentioned disadvantages. For this purpose, the device of the invention, which is additionally complying with the generic definition given in the preamble above, is mainly characterized in that the first and second shafts are concentric, with the first and second axes of rotation being mixed into the same common axis of rotation, and in that the visual information member is self-supporting and extends in the transverse direction and away from the common axis of rotation, on a length exceeding that of the guide member. "Self-supporting" means here it can be applied to any object capable of supporting its own weight without being remarkably deformed, as is traditionally the case, for instance, for the pointer of an instrument panel indicator.

In the preferred embodiment of the invention, at least the first shaft is hollow and at least partially surrounds the second shaft. For instance, the guide member substantially includes a slide rotatably integral with the first shaft and wherein the visual information member is guided in translation, in the transverse direction, like a crosshead. In this case, it can be provided for the kinematic link to include a mutually engaged rack and pinion, for the pinion to be carried by the second shaft and to be rotatably stationary with respect to the second shaft about the common axis of rotation, for the visual information member to be provided with a fork including two branches extending in the transverse direction, for the two branches of the fork to be mutually parallel and positioned on either side of the pinion, for the rack to be formed on an inner face of the first branch of the fork, and for the inner face of the second branch of the fork to freely slide with respect to the pinion. The indicator device may advantageously include a box wherein at least the two motors are accommodated, and forming at least with such motors, with the visual information member, and with the kinematic link, an indicator module. In this case, the box has a thickness extending in the common direction of the shafts and a mid-plane perpendicular to such common direction, and the two motors are positioned side by side in the mid-plane of the box without any mutual overlapping in the thickness of same box.

The indicator device may also include a dial opposite which the visual information member is selectively moved. The dial can then include a first scale selectively scanned by a singular point of the visual information member by the rotation of such visual information member about the common axis of rotation, and a second scale selectively scanned by the singular point of the visual information member by translation of such visual information member in the transverse direction. Such dial has, for instance, an at least partially oval or elliptic shape. Alternately, such dial may include a pattern provided with several sectors opposite which the singular point of the visual information member is moved. In a possible embodiment, the visual information member includes, or is constituted of a pointer extending in the transverse direction._

BRIEF DESCRIPTION OF THE FIGURES

Other characteristics and advantages of the invention are mentioned in details in the following description which is indicative and not restrictive while referring to the appended drawings, in which.

DETAILED DESCRIPTION

Figure 1:
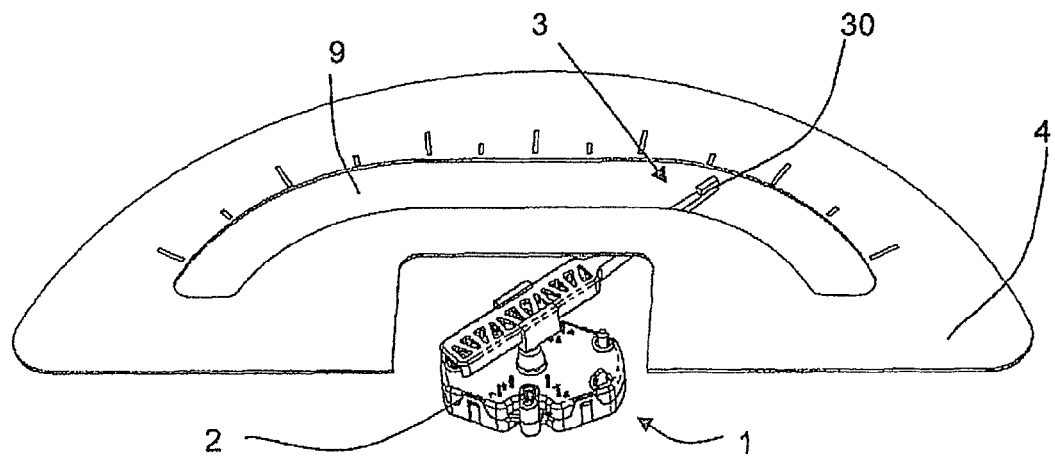
FIG. 1 is a perspective view of a possible embodiment of the invention, using a first type scale.

As mentioned above, the invention relates to an indicator device that can be used, more particularly, on the instrument panel of a vehicle. This module 1 more particularly includes two electric motors 10 and 11, two concentric shafts 12 and 13 and one visual information member 3, with such visual information member being composed of a pointed in the embodiment illustrated and not restrictively disclosed hereinafter. In any event, the visual information member 3 must be self-supporting, i.e. able to support its own weight without showing any remarkable deformation.

Both shafts 12 and 13 extend in a common direction and are selectively driven in rotation about a common axis of rotation Z by the respective motors 10 and 11, with the motor 10 thus driving the shaft 12 and the motor 11 the shaft 13. The visual information member 3 which has an elongated shape characteristic of a pointer, is rotatably linked to the shaft 12 about the axis of rotation Z, such member 3 thus having a length placed in a transverse direction Y with respect to the axis of rotation Z, and for instance perpendicular to the axis Z. The indicator device of the invention further includes a kinematic link connecting the shaft 13 to the pointer 3 and which is so designed as to transform a rotation of this shaft 13 about the common axis of rotation Z into a translation of the pointer 3 along the length thereof, in the direction Y, with the pointer 3 being free to make a translation along its length, in the direction Y with respect to the shaft 12.

In the illustrated embodiment, the shaft 12 is hollow, surrounds the shaft 13 and its free end is provided with a slide 5 which is rotatably stationary with respect to this shaft 12, and wherein the pointer 3 is guided in translation, like a crosshead, in the direction Y of its length. In addition, the length of the pointer 3 in the direction Y is greater than the length of the slide 5 in the same direction Y. The kinematic link mentioned above may then include mutually engaged rack 7 and pinion 8, the pinion 8 being carried by the inner shaft 13 and rotatably stationary with respect to this shaft 13 about the common axis of rotation Z.

Figure 2:
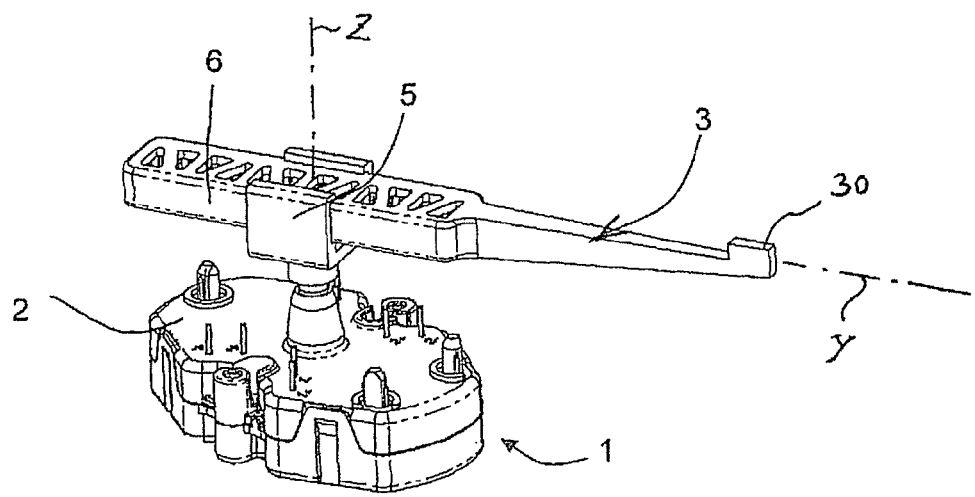
FIG. 2 is a closer perspective view of the indicator module shown in FIG. 1.
Figure 3:
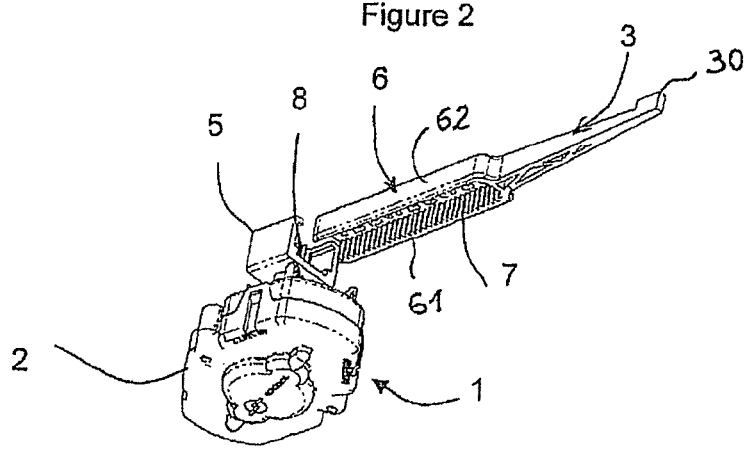
FIG. 3 is an exploded view of the indicator module illustrated in FIG. 2, as seen along a first angle of incidence.
Figure 6:
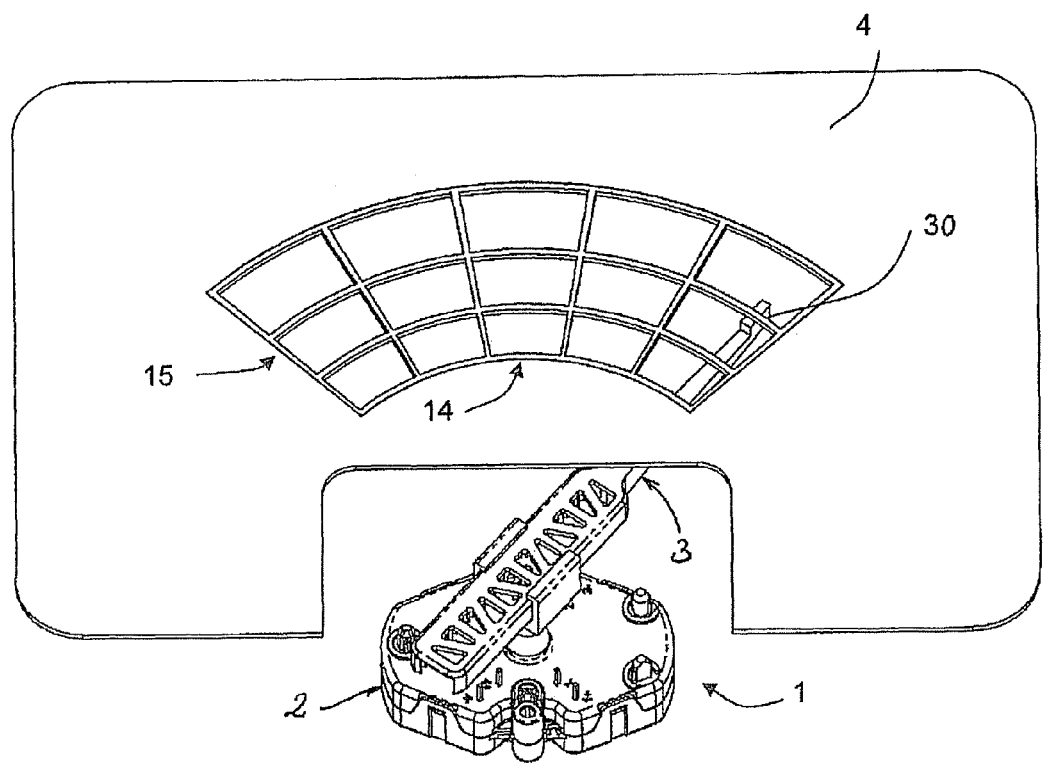
FIG. 6 is a perspective view of a possible embodiment of the invention, using a second type scale.
Figure 7:
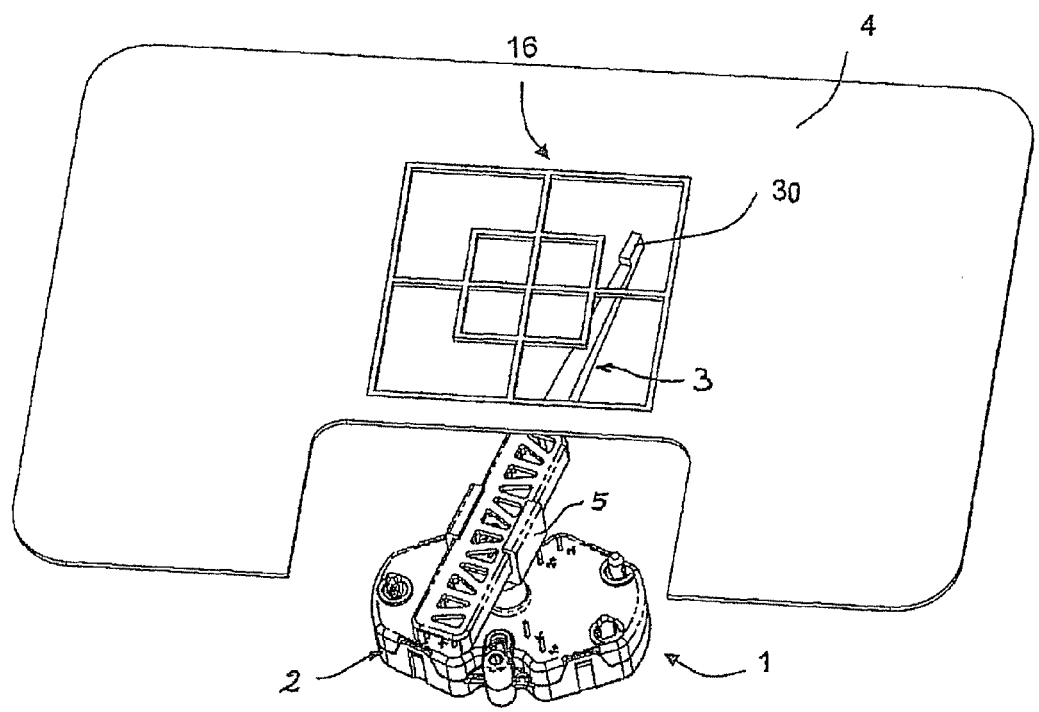
FIG. 7 is a perspective view of a possible embodiment of the invention, using a third type scale.

The pointer is provided with a pattern 6 formed by two branches 61 and 62 which extend in parallel, along the length of the pointer 3 and positioned on either side of the pinion 8. In such an arrangement, the rack 7 is for instance formed on the inner face of the branch 61 of the fork 6, with the inner face of the other branch 62 being, on the contrary, preferably smooth and/or placed at a distance from the pinion 8 to be able to slide freely with respect to such pinion. As illustrated in FIGS. 2, 6 and 7, the pointer 3, in the illustrated embodiment, is slidingly mounted in the slide 5 by the outer faces of the branches 61 and 62 of the fork 6.

Figure 4:
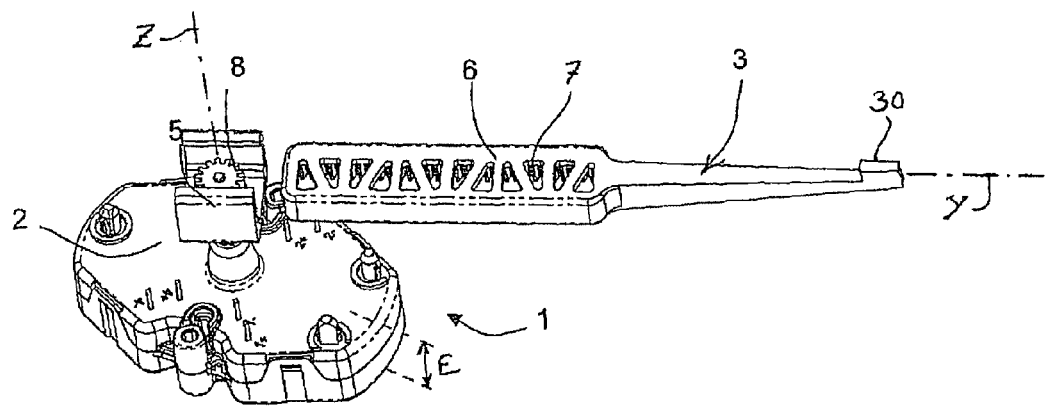
FIG. 4 is an exploded view of the indicator module illustrated in FIG. 2, as seen along a second angle of incidence.
Figure 5:
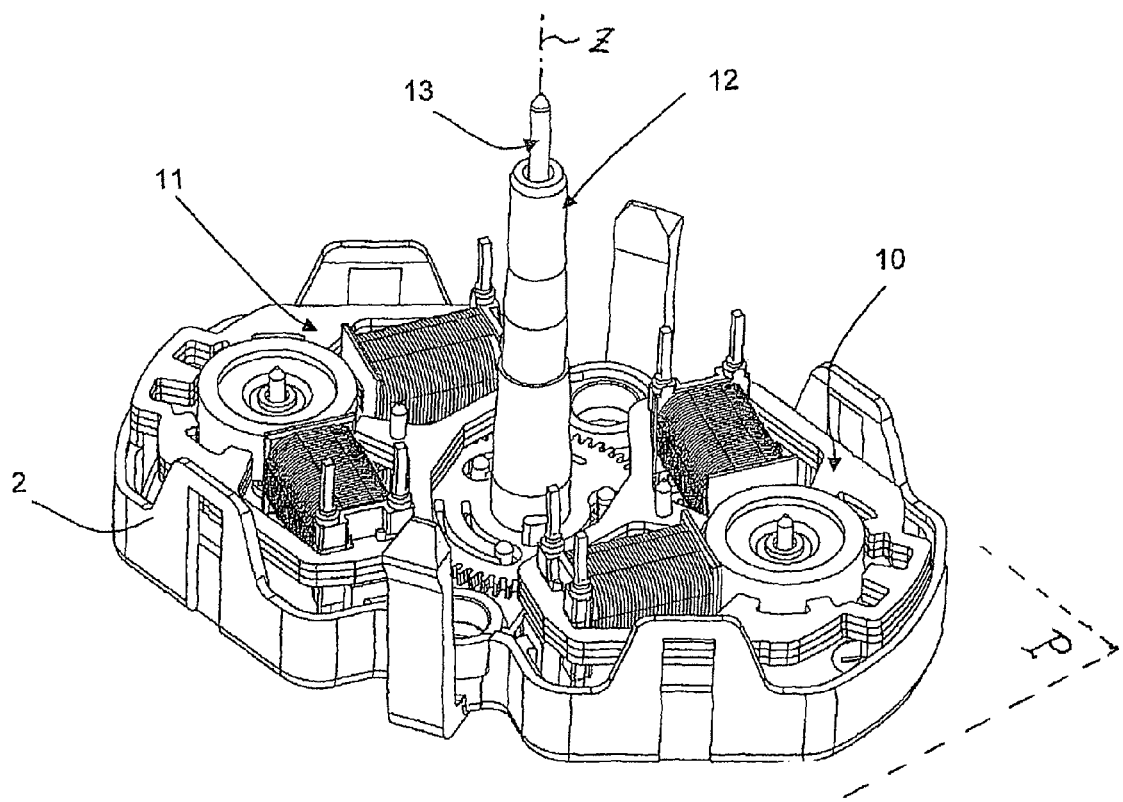
FIG. 5 is a closer perspective view of the inside of the indicator module shown in FIG. 2.

The indicator module 1 further preferably includes a box 2 wherein the motors 10 and 11 are accommodated. Such box 2 forms, at least with the shafts 10 and 11, with the visual information member 3, i.e. composed of a pointer, and with the kinematic link 7 and 8, a material unit fulfilling the function of an indicator module 1. The box 2 has, in the common direction of the shafts 12 and 13, a minimum dimension E, or thickness (FIG. 4), at least approximately constant and cut by a mid-plane P (FIG. 5) on either side of which the box 2 extends.

The motors 10 and 11 are preferably positioned side by side in the mid-plane P of the box 2 without any mutual overlapping in the thickness E of same box. The motors 10 and 11 drive the shafts 12 and 13 though idlers (not shown) as per the principle well known to the specialist and for instance disclosed in the above-mentioned patent FR 2 885 688.

As shown in FIGS. 1, 6 and 7, the indicator device may include, in addition to the indicator module 1, a dial 4 stationary with respect to the box 2 and opposite which the pointer 3 operatively moves. This dial 4, which is, for instance a tachometer, may, if opaque and if the pointer 3 is not positioned in front of its visible face, include an opening 9 (FIG. 1) substantially showing only the end 30 of the pointer 3 which is a singular point of the particular visual information member 3 formed by the pointer 3. As the end 30 of the pointer 3 does not have to move exclusively along a purely linear or purely circular path, but may, on the contrary, be moved as required in a 2-dimension space by combining the rotation and translation motions, which are respectively controlled by the motors 10 and 11, the opening 9, and more generally the path of the end 30 of the pointer 3 does not have to have the conventional arc shape, but may, for instance have a partially elliptic or oval shape (FIGS. 1 and 6). For the same reason, i.e. the possibility of moving, as required, within a 2-dimension space any singular point of the visual information member 3, i.e. the end 30 of the pointer 3, the dial 4 may be so designed as to have two different scales.

More precisely, the dial 4 may include a first scale 14 that the end 30 of the pointer 3 can operatively scan by the rotation of such pointer 3 about the common axis of rotation Z, and a second scale 15 that the end 30 of the pointer 3 can operatively scan by translation of such pointer 3 in the direction Y of its length. The first scale 14 can thus, for instance, give an indication of the vehicle speed, whereas the second scale 15 gives for instance an indication of the motor speed. In this example, and as the specialists will easily understand when reading the present description, the motor 11 which controls the pinion 8 through the shaft 13 to report the motor speed on the radial scale 15 shall then have to receive a speed set point representing not only the motor speed but also the vehicle speed, so as to ensure the correct display of the motor speed, since this display not only depends on the rotating motion of the shaft 13, but also depends on the relative rotating motion about the axis Z of such shaft 13 with respect to the shaft 12, the angular position of which represents the speed of the vehicle.

In an alternative solution illustrated in FIG. 7, the dial 4 includes, for instance, a pattern 16 provided with several sectors, opposite which the end 30 of the pointer 3 can be operatively moved. The possible planar motion of the pointer 3 enables the end 30 thereof to reach any sector of the pattern and to indicate an area of maximum comfort in the utilization of the vehicle by combining, for instance and not restrictively, the information relating to the consumption, the motor speed, or the vehicle speed. The assembly is then very compact insofar as the overall dimensions are essentially reduced to those of the pointer 3, which is the only part to be able to move linearly, and wherein the shape of the dial 4 does not have to be that of a circular crown portion.

The invention claimed is:

1. An indicator device for use on an instrument panel of a vehicle, the indicator device comprising at least a first and a second motor, a first and a second shaft, a guide member, a visual information member and a kinematic link, with the first and second shafts being selectively driven in rotation by the respective first and second motors about respective first and second axes of rotation, with the guide member being rotatably linked to the first shaft about the first axis of rotation and extending in a transverse direction relative to this first axis of rotation, with the visual information member being guided in translation, in the transverse direction, by the guide member, and the kinematic link connecting the second shaft to the visual information member and selectively transforming a rotation of the second shaft about the second axis of rotation into a translation of the visual information member in the transverse direction, wherein the first and second shafts are concentric, with the first and second axes of rotation being mixed into the same common axis of rotation, and in that the visual information member is self-supporting and extends in the transverse direction and at a distance from the common axis of rotation on a greater length than the guide member.

2. An indicator device according to claim 1, wherein at least the first shaft is hollow and at least partially surrounds the second shaft.

3. An indicator device according to claim 1, wherein the guide member substantially includes a slide rotatably integral with the first shaft and wherein the visual information member is guided in translation, in the transverse direction like a crosshead.

4. An indicator device according to claim 3, wherein the kinematic link includes a mutually engaged rack and pinion, the pinion is carried by the second shaft and rotatably stationary with respect to the second shaft about the common axis of rotation, the visual information member is provided with a fork including two branches extending in said transverse direction, the two branches of the fork are mutually parallel and positioned on either side of the pinion, the rack is formed on an inner face of the first branch of the fork, and the inner face of the second branch of the fork freely slides with respect to the pinion.

5. An indicator device according to claim 1, further comprising a box wherein at least the two motors are accommodated, and forming at least with such motors, with the visual information member, and with the kinematic link, an indicator module.

6. An indicator device according to claim 5, wherein the box has a thickness extending in the common direction of the shafts and a mid-plane perpendicular to the common direction, and the two motors are positioned side by side in the mid-plane of the box without any mutual overlapping in the thickness of same box.

7. An indicator device according to claim 1, further comprising a dial opposite which the visual information member is selectively moved.

8. An indicator device according to claim 7, wherein the dial includes a first scale selectively scanned by a singular point of the visual information member by the rotation of such visual information member about the common axis of rotation, and a second scale selectively scanned by the singular point of the visual information member by translation of such visual information member in the transverse direction.

9. An indicator device according to claim 7, wherein the dial has an at least partially oval or elliptic shape.

10. An indicator device according to claim 8, wherein the dial includes a pattern provided with several sectors opposite which the singular point of the visual information member is selectively moved.

11. An indicator device according to claim 1, wherein the visual information member includes or is made of a pointer extending in the transverse direction.

12. A device according to claim 11, further comprising a singular point of the visual information member is constituted of the pointer end.

* * * * *